(12) United States Patent
Haley et al.

(10) Patent No.: US 12,549,467 B2
(45) Date of Patent: Feb. 10, 2026

(54) DISTRIBUTED PACKET REPLAY

(71) Applicant: Spirent Communications, Inc., San Jose, CA (US)

(72) Inventors: Michael Haley, Marlboro, MA (US); David Theodore Mozzoni, II, Warwick, RI (US); Fanny Mlinarsky, Bolton, MA (US)

(73) Assignee: Spirent Commnications, Inc., Santa Clara, CA (US)

( * ) Notice: Subject to any disclaimer, the term of this patent is extended or adjusted under 35 U.S.C. 154(b) by 349 days.

(21) Appl. No.: 18/202,230

(22) Filed: May 25, 2023

(65) Prior Publication Data

US 2023/0388211 A1 Nov. 30, 2023

Related U.S. Application Data

(60) Provisional application No. 63/345,883, filed on May 25, 2022.

(51) Int. Cl.
*H04L 43/106* (2022.01)
*H04L 47/283* (2022.01)
(Continued)

(52) U.S. Cl.
CPC .......... *H04L 43/106* (2013.01); *H04L 47/283* (2013.01); *H04W 24/08* (2013.01); *H04W 84/12* (2013.01)

(58) Field of Classification Search
CPC .... H04L 43/106; H04L 47/283; H04W 24/08; H04W 84/12
See application file for complete search history.

(56) References Cited

U.S. PATENT DOCUMENTS 6,724,730 B1 4/2004 Mlinarsky et al.
7,075,893 B1 7/2006 Mlinarsky et al.
(Continued)

OTHER PUBLICATIONS

OCTOBOX Pal-6E, and STApal-6E Product datasheet, Spirent Communications, Inc., Mar. 21, 2022, 25 pages (downloaded Jan. 24, 2023 from https://www.spirent.com/assets/u/datasheet-octobox-pal-6e-and-stapal-6e).

(Continued)

*Primary Examiner* — Siming Liu
(74) *Attorney, Agent, or Firm* — HAYNES BEFFEL & WOLFELD LLP; Ernest J. Beffel, Jr.

(57) ABSTRACT

The disclosed technology teaches systems and methods for high fidelity emulation of a Wi-Fi environment for testing with three or more transmitters set to differing output signal strengths. The disclosed method includes using a PCAP file of captured packets from multiple stations with respective source addresses, RF bands, and channels within bands. The captured packets record metadata containing, at least, signal strength and time stamps. The method further includes analyzing the PCAP file to determine pairs of source addresses and channels, evaluating the pairs for signal strength, and allocating the pairs to three or more transmitters based on grouping by at least the channels and the evaluated signal strengths, and using the time stamps on the captured packets, replaying with synchronization over the transmitters at the set output signal strengths. The PCAP file can include packets from multiple protocols, and time-varying pairs with varying signal strength over time.

18 Claims, 7 Drawing Sheets

(51) Int. Cl.
*H04W 24/08* (2009.01)
*H04W 84/12* (2009.01)

(56) References Cited

U.S. PATENT DOCUMENTS

| | | |
|---|---|---|
| 8,793,541 B2 | 7/2014 | Hsu et al. |
| 10,520,534 B1 | 12/2019 | Rowell et al. |
| 10,893,494 B2 | 1/2021 | Chinitz et al. |
| 2004/0236866 A1 | 11/2004 | Dugatkin et al. |
| 2005/0053008 A1 | 3/2005 | Griesing et al. |
| 2005/0226195 A1 | 10/2005 | Paris et al. |
| 2006/0229020 A1 | 10/2006 | Mlinarsky et al. |
| 2006/0233111 A1 | 10/2006 | Wright |
| 2006/0239198 A1 | 10/2006 | Mlinarsky et al. |
| 2007/0159199 A1 | 7/2007 | Talwar et al. |
| 2008/0151762 A1 | 6/2008 | Armstrong et al. |
| 2009/0072838 A1 | 3/2009 | Shepherd et al. |
| 2009/0072843 A1 | 3/2009 | Slupsky et al. |
| 2012/0039178 A1 | 2/2012 | Holman et al. |
| 2012/0084605 A1* | 4/2012 | Shilon ............... H04L 43/50 714/33 |
| 2012/0101985 A1 | 4/2012 | Kemp et al. |
| 2012/0207030 A1 | 8/2012 | Luong |
| 2012/0296996 A1 | 11/2012 | Lehavi et al. |
| 2012/0317224 A1 | 12/2012 | Caldwell et al. |
| 2013/0016739 A1 | 1/2013 | Penisoara et al. |
| 2013/0033279 A1 | 2/2013 | Sozanski et al. |
| 2013/0054170 A1 | 2/2013 | Sobajic et al. |
| 2013/0145212 A1 | 6/2013 | Hsu et al. |
| 2013/0347103 A1 | 12/2013 | Veteikis et al. |
| 2014/0092807 A1 | 4/2014 | Zhao |
| 2014/0098846 A1 | 4/2014 | Emmanuel et al. |
| 2014/0207935 A1* | 7/2014 | Gopshtein ............... H04L 43/50 709/224 |
| 2014/0254647 A1 | 9/2014 | Stott et al. |
| 2015/0109941 A1 | 4/2015 | Zhang et al. |
| 2015/0242294 A1 | 8/2015 | Lapierre et al. |
| 2015/0253357 A1 | 9/2015 | Olgaard |
| 2016/0072594 A1 | 3/2016 | Yuan et al. |
| 2016/0373944 A1 | 12/2016 | Jain et al. |
| 2017/0135145 A1 | 5/2017 | Amini et al. |
| 2017/0223559 A1 | 8/2017 | Kong et al. |
| 2018/0006745 A1 | 1/2018 | Vanwiggeren |
| 2019/0155327 A1 | 5/2019 | Zaidman et al. |
| 2020/0028905 A1 | 1/2020 | Chinitz et al. |

OTHER PUBLICATIONS

MCS Index and 7MCS Wi-Fi Experience Score, WiFi Fundamentals, 7signal.com, 5 pages (download Feb. 8, 2022 from https://www.7signal.com/info/mcs_.

U.S. Appl. No. 16/515,786, filed Jul. 18, 2019, U.S. Pat. No. 10,893,494, Jan. 12, 2021.

U.S. Appl. No. 18/106,967, filed Feb. 7, 2023, 20230254226, Aug. 10, 2023.

* cited by examiner

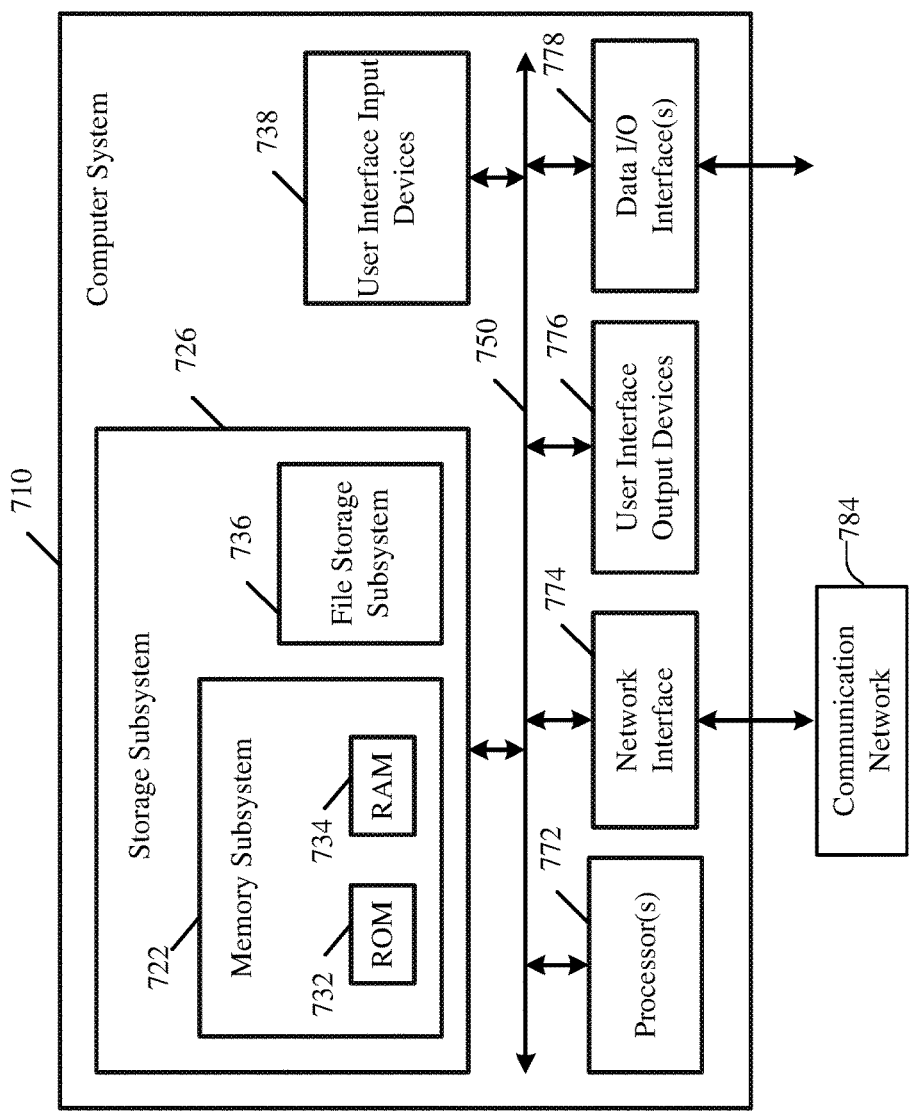
Fig. 7 Computer System

DISTRIBUTED PACKET REPLAY

PRIORITY APPLICATIONS

This application claims the benefit of and priority to U.S. Provisional Patent Application No. 63/345,883, titled "Distributed Packet Replay," filed 25 May 2022.

RELATED APPLICATION

This application is related to the following commonly owned applications:

U.S. patent application Ser. No. 16/515,786, titled "System and Method for Synchronizing Protocol Analyzers During Wireless Testing," filed 18 Jul. 2019, now U.S. Pat. No. 10,893,494, issued 12 Jan. 2021.

U.S. patent application Ser. No. 18/106,967, titled "Packet Capture Based Wi-Fi Performance Analysis," filed 7 Feb. 2023 which claims the benefit of U.S. Provisional Application 63/307,973, filed 8 Feb. 2022.

The related applications are hereby incorporated by reference herein for all purposes.

FIELD OF THE TECHNOLOGY DISCLOSED

The technology disclosed relates to packet capture based Wi-Fi® distributed packet replay.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The Wi-Fi industry is going through major and rapid technology evolutions, enabling many new residential and enterprise use cases. With new Wi-Fi technologies such as Wi-Fi 6E and Wi-Fi 7, testing is more important than ever before, but the complexities and challenges of testing can become overwhelming for any organization. A need exists for testing throughput and bandwidth and other performance measures during the many phases of product and network life cycles, especially for deploying next-generation Wi-Fi products and networks quickly and efficiently.

An opportunity arises for high fidelity emulation of a Wi-Fi environment for testing with transmitters and for determination of the performance of the network devices. Better, more easily operated, more resilient and transparent consumer experiences and systems may result.

SUMMARY

The technology disclosed relates to high fidelity emulation of a Wi-Fi environment for testing with transmitters.

While single replay capabilities exist, the technology disclosed provides a system and methods for the synchronized replay of multiple captured packets leveraging a distribution of multiple devices. The technology disclosed provides a method for replaying network traffic that can be used to test "real-life" conditions that are time-synchronized, signal level accurate, and spanning multiple channels that more closely represents multi-client, real world scenarios. The system and methods for high fidelity emulation of a Wi-Fi environment benefits from synchronized multi-sniffer packet capture.

The disclosed method includes analysis of a master PCAP file containing captured packets with respective source addresses, RF bands, and channels within RF bands. Metadata associated with the captured packets can include signal strength, time stamps, source addresses, and MAC addresses. The masterPCAP file can be analyzed to determine source address/channel pairs that can be further evaluated for signal strength, enabling the allocation of pairs to a plurality of transmitters based on groupings by channels and evaluated signal strengths. The time stamps on the captured packets can be leveraged to replay the individual captured packets with synchronization over the transmitters at set output signal strengths. The PCAP file can include packets from multiple protocols and time-varying pairs with varying signal strength overtime.

Particular aspects of the technology disclosed are described in the claims, specification, and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 illustrates the start of the process by analyzing the master PCAP file to produce a report of Wi-Fi transmitters on each channel.

FIG. 4 illustrates the second step of the process for transforming a master PCAP file into a distributed Wi-Fi packet replay session: assigning channels and transmitters to each of the replay devices.

FIG. 5 illustrates the third step of the process for transforming a master PCAP file into a distributed Wi-Fi packet replay session: producing individual PCAP files for each replay device.

FIG. 6 shows the next step of the process for transforming a master PCAP file into a distributed Wi-Fi packet replay session: determining the level setting for each attenuator.

FIG. 7 is a simplified block diagram of an embodiment of a system that can be used for high fidelity emulation of a Wi-Fi environment for testing with transmitters, according to one embodiment of the disclosed technology.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

Disclosed is a system comprising hardware, software and processing methods that provide the ability to replay a captured packet file (i.e., PCAP file) into the Wi-Fi radio frequency medium in a manner that is more realistic than a standard replay from a single replay device.

The disclosed technology produces a more real-life combination of signal levels in a Wi-Fi test environment by distributing replay packets from a master PCAP file across multiple transmitters attenuated to operate at different signal output levels. Using a time synchronized set of replay devices that are connected to a set of RF signal attenuators, it is possible to provide a more real-life combination of signal levels for the different transmitters represented in the master PCAP file. This improves over replaying many packet sources using a single transmitter that outputs at one output level. It also improves over arbitrary assignment of packets to multiple transmitters, without regard for desired signal levels of packets or sources.

The master PCAP file contains a timestamp ordered series of Wi-Fi packets generated by Wi-Fi transmitters (e.g., access point, station, mesh node) on Wi-Fi channels. There are a large variety of possible packet captures from a Wi-Fi session. The simplest example is a packet capture from one sniffer device. Multiple sniffers offer the ability to capture packets from multiple Wi-Fi channels or locations. Packet captures can be live or can be stored and read back later. U.S. Pat. No. 10,893,494, "System and Method for Synchronizing Protocol Analyzers During Wireless Testing", incorporated by reference herein for all purposes, describes advantageous and desirable packet capture. Applicant's product is trademarked as "synchroSniffer™". The synchroSniffer system comprises multiple sniffer devices, each time synchronized together and capable of independent packet filtering. The filtering can allow individual sniffers to focus on and capture packets from a single device such as a device under test (DUT).

The disclosed technology is different from other replays because power varies among distributed replay devices and packets are assigned to replay devices based on channel groups and similar Received Signal Strength Indicator of packets. Packets in PCAP files, which can be viewed using an open-source packet analyzer such as Wireshark, can contain a wiretap header with information fields that represent capture device and received signal power. Multiple stations can be captured and stations can be assigned to different replay devices and antennas, corresponding to the channel and Received Signal Strength Indicator of a captured packet.

Figure 1:
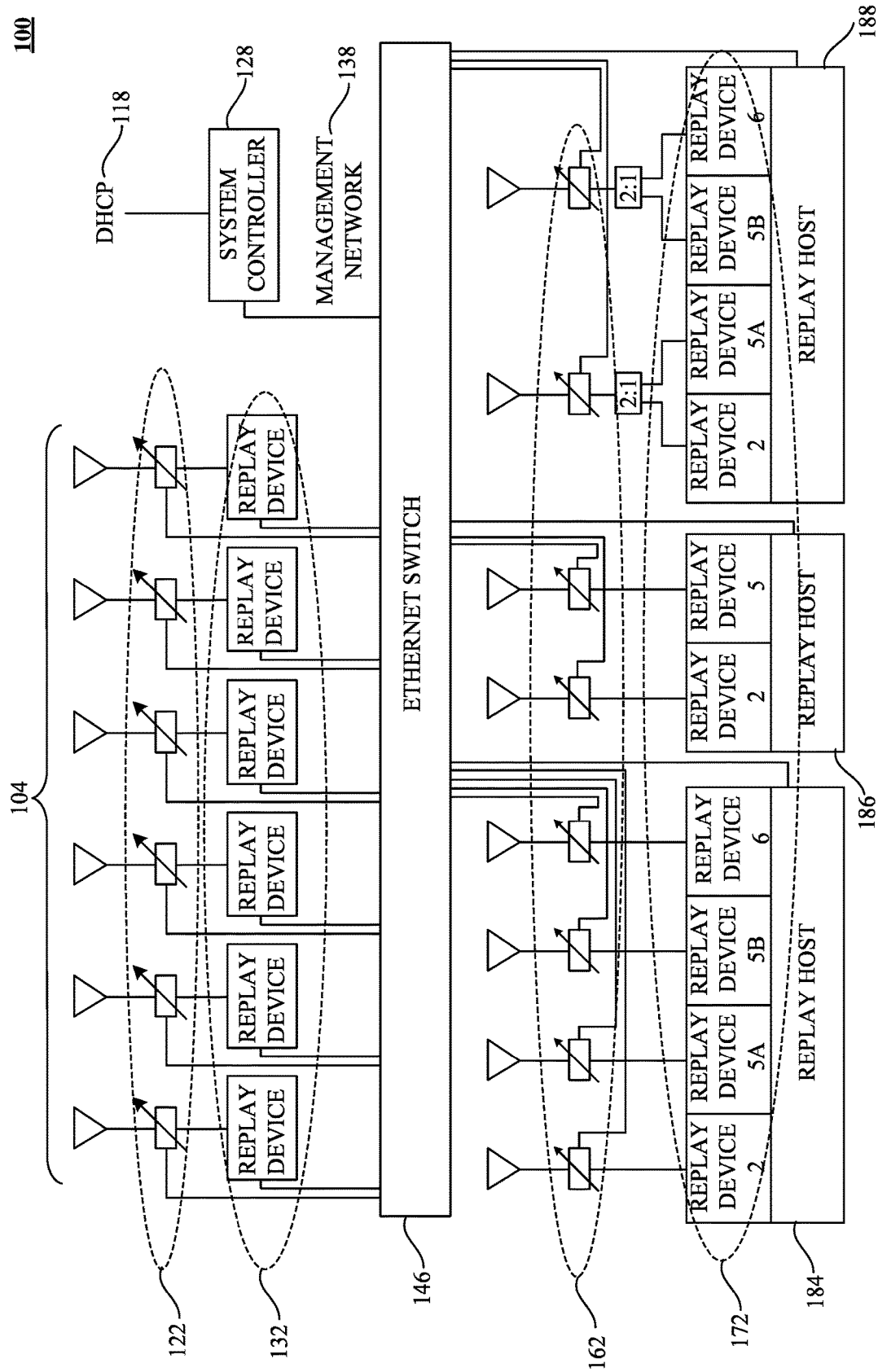
FIG. 1 illustrates a block diagram of a representative system for high fidelity emulation of a Wi-Fi environment for testing with transmitters, according to one embodiment of the disclosed technology.

FIG. 1 shows an example system 100 for high fidelity emulation of a Wi-Fi environment for testing with transmitters. System 100 provides the ability to replay a captured packet file (i.e., PCAPfile) into the Wi-Fi radio frequency medium in a manner that is more realistic than a standard replay from a single replay device. For example, many implementations of system 100 are configured to analyze PCAP files from multiple stations with respective source addresses, RF bands, and channels within bands. The captured packets within the PCAP files record various types of metadata, such as signal strength and time stamps. The PCAP files can be analyzed by determining respective pairs of source address and channel data, followed by evaluating the pairs for signal strength. After evaluating signal strengths, the pairs can be allocated to a number of transmitters (i.e., two transmitters, three transmitters, or more than three transmitters) via grouping the pairs by, at least, the channels and the evaluated signal strengths. Thus, output signal strengths of the transmitters can be set based on the evaluated signal strengths of the pairs. By using the time stamps in the captured packets, a time synchronization protocol can be used to replay the captured packets with synchronization over the transmitters. First, the components of system 100 will be described.

System 100 includes a set of replay devices 104, DHCP 118, system controller 128, management network 138, ethernet switch 146 and replay hosts 184, 186, and 188. The set of replay devices 104 further includes attenuators 122 and computers 132. Within the set of replay devices 104, each respective replay device comprises a computer 132 capable of transmitting a PCAP file to an attenuator 132, with attenuator 122 connected to an antenna. System 100 also includes a schematic illustration of further replay devices 172, each respectively connected to an attenuator 162 and an antenna, wherein replay devices 172 are connected in groups to either replay host 184, replay host 186, or replay host 188. In one implementation, the RF attenuators 122, 162 can be Spirent quadAtten (QA-x) attenuators. Different attenuators can be used in another implementations. DHCP 118 is a network management protocol used on Internet Protocol networks for automatically assigning IP addresses and other communication parameters to devices connected to the network.

System controller 128 is a general purpose computer that coordinates the time synchronization of replay devices 132, 172, sets the level of attenuators 122 and 162, and performs the processing needed to transform a master PCAP file into individual PCAP files for each respective replay device. Within the context of system 100, two example implementations will be described with respect to the set of replay devices 104, groups connected to replay host 184, groups connected to replay host 186, and groups connected to replay host 188. It is to be understood that these implementations are illustrated within FIG. 1 and described herein explicitly as demonstrative examples and should not be considered limiting to the scope of the technology disclosed.

System controller 128, acting as a precision time protocol (PTP) server with replay devices as its PTP clients, performs a sequence of operations causing transformation of a master PCAP file into a distributed Wi-Fi packet replay session. The master PCAP file includes packets from multiple stations (i.e., multiple source addresses), multiple channels (i.e., varying channels), having differing signal strengths, and having differing time stamps. In one implementation, the process of transforming the master PCAP file into a distributed Wi-Fi packet replay session involves: (i) analyzing the master PCAP file to produce a report of Wi-Fi transmitters on each channel, (ii) assigning channels and transmitters to each replay device 104, (iii) producing individual PCAP files for each replay device 104, (iv) determining the level setting for each attenuator 132, (v) starting the packet playback of all of the replay devices 104 simultaneously, and (vi) stopping the packet playback of the replay devices 104. The master PCAP file analysis is described in further detail below within the description of FIG. 2. The final result of the master PCAP file analysis by system controller 128 is a report that lists each unique transmitter's channel, MAC address, packet count, and Received Signal Strength Indicator (RSSI) statistics. RSSI is a measurement of the power present in a received radio signal. RSSI is measured in dBm which is an absolute power level, with 0 dBm equal to 1 milliwatt. RSSI is a measurement of how well a device can hear a signal from a Wi-Fi device, which is useful for determining whether enough signal is available to get a good wireless connection.

The process to determine the level setting for each attenuator 122 involves a consideration of the replay device 132 connected to the respective attenuator 122, and evaluation of the individual PCAP files for the replay device 132.

After producing replay device 132 PCAP files and determining attenuator 122 settings for each respective replay device in the set of replay devices 104, the system controller 128 sends this information to the replay devices 132 and attenuators 122 via the management ethernet network 138. To start playback on the replay devices 104 simultaneously, the system controller 128 can signal the replay devices 104 to wait for a special multicast or broadcast ethernet packet. When the ethernet packet is sent by system controller 128, the start of playback is signaled. Alternatively, replay devices 104 can be signaled to start playback at an absolute time in the future. To stop playback, there are a large number of signaling methods available to the system controller 128 since there is no need for simultaneous playback stop.

In a second example, the system controller 128 analyzes the master PCAP file to determine individual PCAP files via identifying pairs of source addresses and channels. Because the channels have varying signal strength overtime, the pairs are also evaluated for signal strength. The determined pairs can be allocated to multiple transmitters, such as the three replay hosts 184, 186, and 188 illustrated within system 100. The individual PCAP files can be reallocated as signal strength varies. Replay host 184 is connected to replay devices 172 labeled "2," "5A," "5B," and "6" corresponding to respective channel bands (2.4, 5, and 6 GHz). Two replay devices correspond to the 5 GHz channel band to accommodate individual PCAP files with differing signal strengths. For the replay devices connected to replay host 184, each of the four replay devices 172 is connected to its own respective attenuator 162 and antenna. In contrast, replay host 186 is connected to two replay devices 172, also each connected to its own respective attenuator 162 and antenna, corresponding to the 2.4 GHz and 5 GHz channels bands.

Replay host 188 is connected to four replay devices 172 labeled "2," "5A," "5B," and "6" corresponding to respective channel bands (2.4, 5, and 6 GHz), similarly to replay host 184. In contrast to replay host 184, which is connected to four replay devices 172 each connected to its own individual attenuator 162 and antenna, the replay devices 172 connected to replay host 188 share attenuators in a 2:1 manner such that a 2.4 GHz replay device and a first 5 GHz replay device share a single attenuator 162 and antenna, and a second 5 GHz replay device and a 6 GHz replay device share a single attenuator 162 and antenna. The identification of source address/channel pairs for individual PCAP files, allocation of pairs, and grouping of replay devices to shared attenuators is discussed in further detail within FIG. 3. through FIG. 6.

Figure 2:
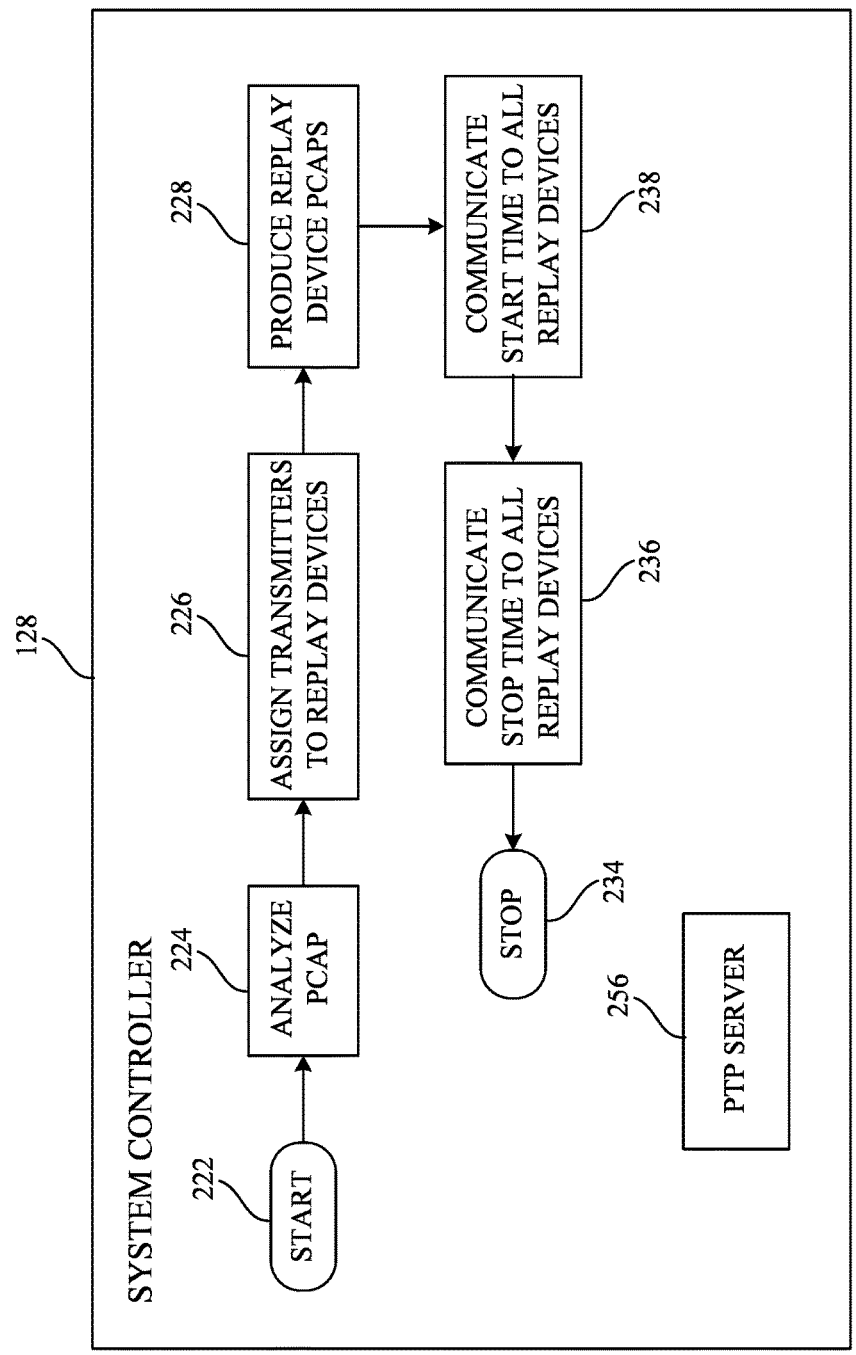
FIG. 2 shows a detailed block diagram of a system controller for high fidelity emulation of a Wi-Fi environment for testing with transmitters, according to one embodiment of the disclosed technology.

FIG. 2 shows a detailed block diagram of system controller 128, a general purpose computer that coordinates the time synchronization of the replay devices 104, sets the levels of the attenuators 122, 162, and performs the processing needed to transform the master PCAP file analyzed at the start 222, into individual PCAP files for each of the replay devices 104. The system controller 128 is the PTP server 256 and the replay devices 104 are its PTP clients.

Within operation 224, the system controller 128 analyzes a master PCAP file. The master PCAP file contains a timestamp ordered series of Wi-Fi packets generated by one or more Wi-Fi transmitters (e.g., access point, station, or mesh node) on one or more Wi-Fi channel bands (e.g., 2.4 GHz, 5 GHz, 6 GHz). These packets are captured from the Wi-Fi medium by one or more time-synchronized packet capture devices, and the packets from each individual device are then merged in timestamp order to produce the master PCAP file. The time synchronization of the distributed replay devices is provided by the PTP operating on a dedicated management ethernet network 138 to which all of the controllable system components of system 100 are connected. The analysis within operation 224, as described in further detail within FIG. 3, involves the production of a report of Wi-Fi transmitters on each channel.

Next, within operation 226, the system controller 128 performs the assignment of channels and transmitters to each replay device. The assignment of transmitters to replay devices is described in further detail within FIG. 4. After operation 226, within operation 228, the system controller 128 produces individual PCAP files for each replay device. The production of PCAP files for each replay device is described in further detail within FIG. 5. Before the start time is communicated to the replay devices in operation 238, a level setting is also determined by the system controller 128 for each attenuator (not shown in FIG. 2). The determination of a level setting for each attenuator is described in further detail within FIG. 6. In operation 238, the system controller 128 communicates a start time to all of the replay devices to start the packet playback simultaneously. Using the time stamps in the packets, the individual PCAP files can be replayed with synchronization of the allocated pairs on the respective transmitters.

To start playback on all of the replay devices simultaneously, the system controller 128 has more than one method available. One method is to signal the replay devices to wait for a special multicast or broadcast ethernet packet. That packet when sent by the system controller 128 would signal that start of playback. Another method is to signal to the replay devices an absolute time in the future at which the playback is to start.

Each replay device participates in the distributed replay session in the same way. After receiving the PCAP file or the beginning of the PCAP stream from the system controller 128, the replay device prepares its hardware and software for the playback and waits for the start signal. Following the communication of a start time to all replay devices in operation 238, the system controller 128 communicates a stop time to all replay devices in operation 236. To stop playback, there are even more signaling methods available to the system controller 128 since there is no need for simultaneous playback stop. Operation 238 is followed by the stop point 234 of the system controller process illustrated within FIG. 2.

FIG. 3 through FIG. 6 illustrate the disclosed process for transforming a master PCAP file into a distributed Wi-Fi packet replay session.

Figure 3:
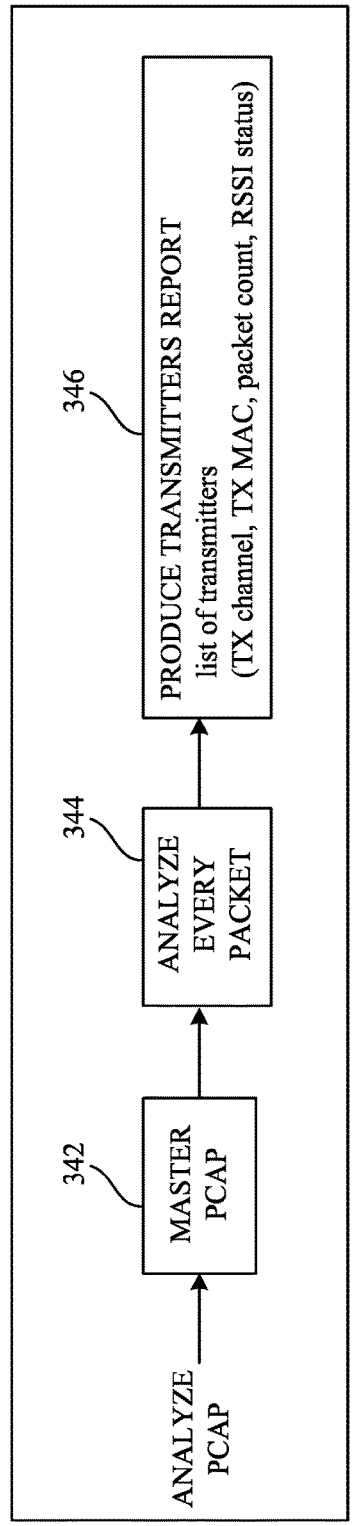
FIG. 3 through FIG. 6 illustrate the disclosed process for transforming a master PCAP file into a distributed Wi-Fi packet replay session.

FIG. 3 illustrates the process starting by analyzing the master PCAP file to produce a report of Wi-Fi transmitters on each channel, which includes analyzing each packet 344 in the master PCAP file 342, looping through the packets in the file. Each packet is examined to produce the transmitter report 346 with a list of transmitters, by extracting the (a) transmitter channel, (b) transmitter MAC address, and (c) RSSI statistics. The combined transmitter channel and MAC address represent a unique transmitter. For each unique transmitter, a count of packets from that transmitter is accumulated, and the RSSI values from the transmitter's packets are reduced to a set of statistics such as minimum, maximum, mode and mean. The final result of master PCAP file analysis 344 is a report 346 that lists each unique transmitter's channel, source media access control (MAC) address, packet count, and RSSI statistics. The list can be communicated by means such as comma-separated values (CSV) format or JavaScript Object Notation (JSON) object.

Figure 4:
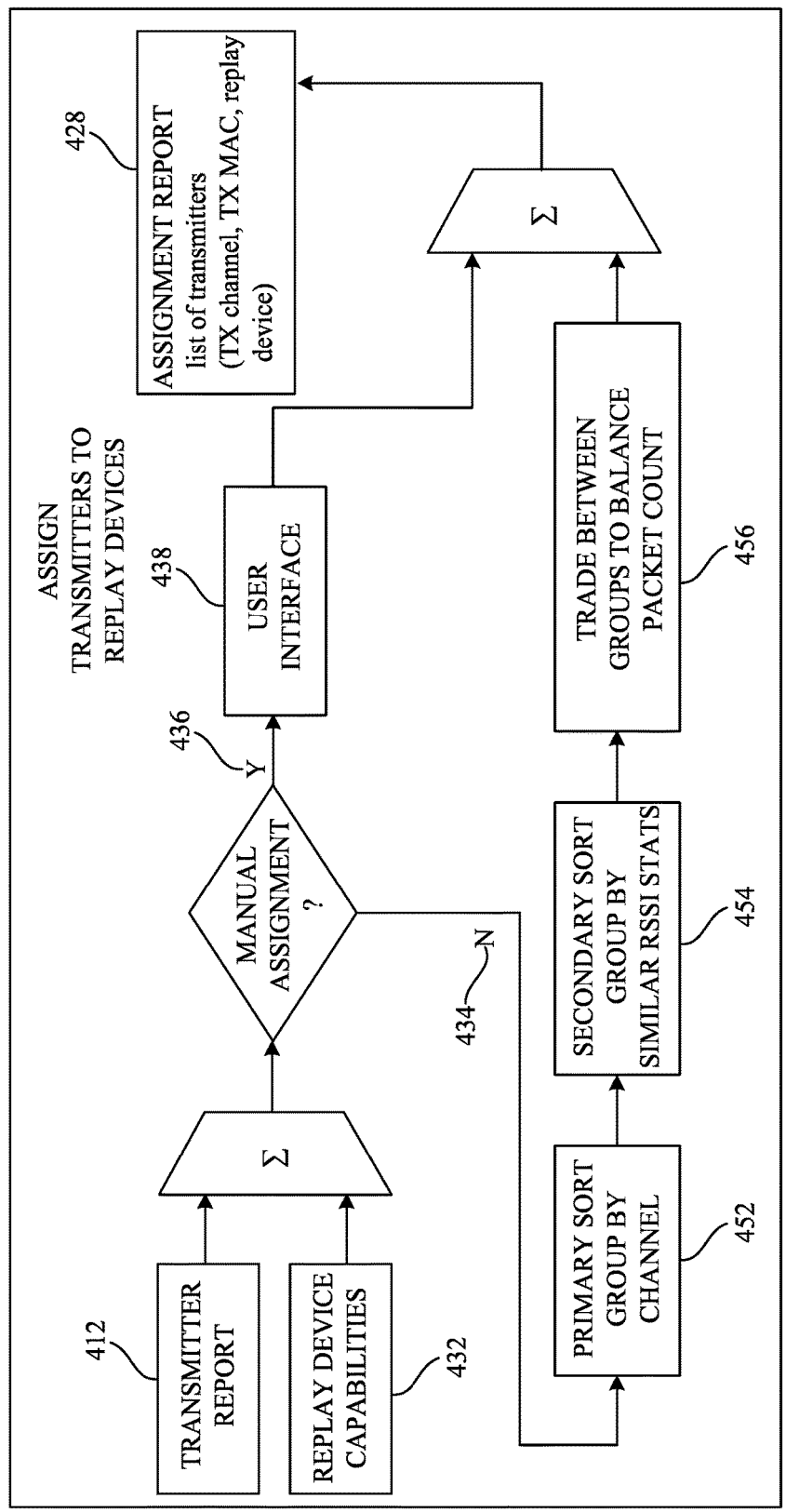

FIG. 4 illustrates the second step of the process for transforming a master PCAP file into a distributed Wi-Fi packet replay session: assigning channels and transmitters to each of the replay devices 104. The assignment of unique transmitters to replay devices can be either manual assignment 436 or automatic assignment 434. In any case, the result is an assignment report 428 that lists each unique transmitter's channel, MAC address, and replay device. The list can be communicated by means such as CSV format or JSON object. Manual assignment 436 employs a user interface 438 that allows a person to perform the assignment. This user interface 438 could take any form and the form is not relevant to the claims of this disclosed technology. Automatic assignment 434 can utilize one of several possible algorithms. Herein described is one example assignment algorithm. A primary sort by channel 452 is performed to group the transmitters by channel band. Each of these channel groups is then subjected to a secondary sort 454 for grouping the transmitters according to one or more of the RSSI statistics. In one example, transmitters can be ordered by decreasing RSSI mean value. Next, the channels provided by each replay device are considered. To elaborate, a replay device is capable of using a channel from one or more frequency bands. For example, one replay device may be able to operate on 5 GHz band only (still this is multiple channels), and another may be able to operate on all bands (2.4, 5, 6) GHz (which is many more channels). It is to be assumed with regard to the implementations disclosed herein that a replay device can be used only for a single channel. Each replay device is assigned a channel from the channel set found in the primary sort 452. In the case in which there are not enough replay devices to match the channel set, the system controller handles the scenario as an error and the distributed replay session gets aborted, in one implementation. After each channel is assigned to one replay device, the remaining replay devices are assigned to any one channel from the channel group or set. The method used to choose the channel for these surplus replay devices is not specified. Example methods include consideration of packets per channel or RSSI stats per channel 454. Next the transmitters are assigned to the replay devices. In the case in which a channel can be provided by a single replay device only, the transmitters for that channel are assigned to that replay device. In the case in which a channel can be provided by more than one replay device, N>1, the transmitters for that channel are divided evenly into the N replay devices. The first replay device will be assigned the top division of the sorted transmitter list, the last replay device will be assigned the bottom division of the list, and so on in between. This assigns to each replay device the transmitters with similar RSSI statistics. Later when the attenuator values are to be determined, this RSSI similarity helps to reduce the effective transmit level error during packet playback. Trade between groups to balance packet count 456 is implemented as needed, wherein transmitters with closely similar RSSI statistics can be traded between replay devices to maximize some outcome such as evenness of packets per replay device.

Figure 5:
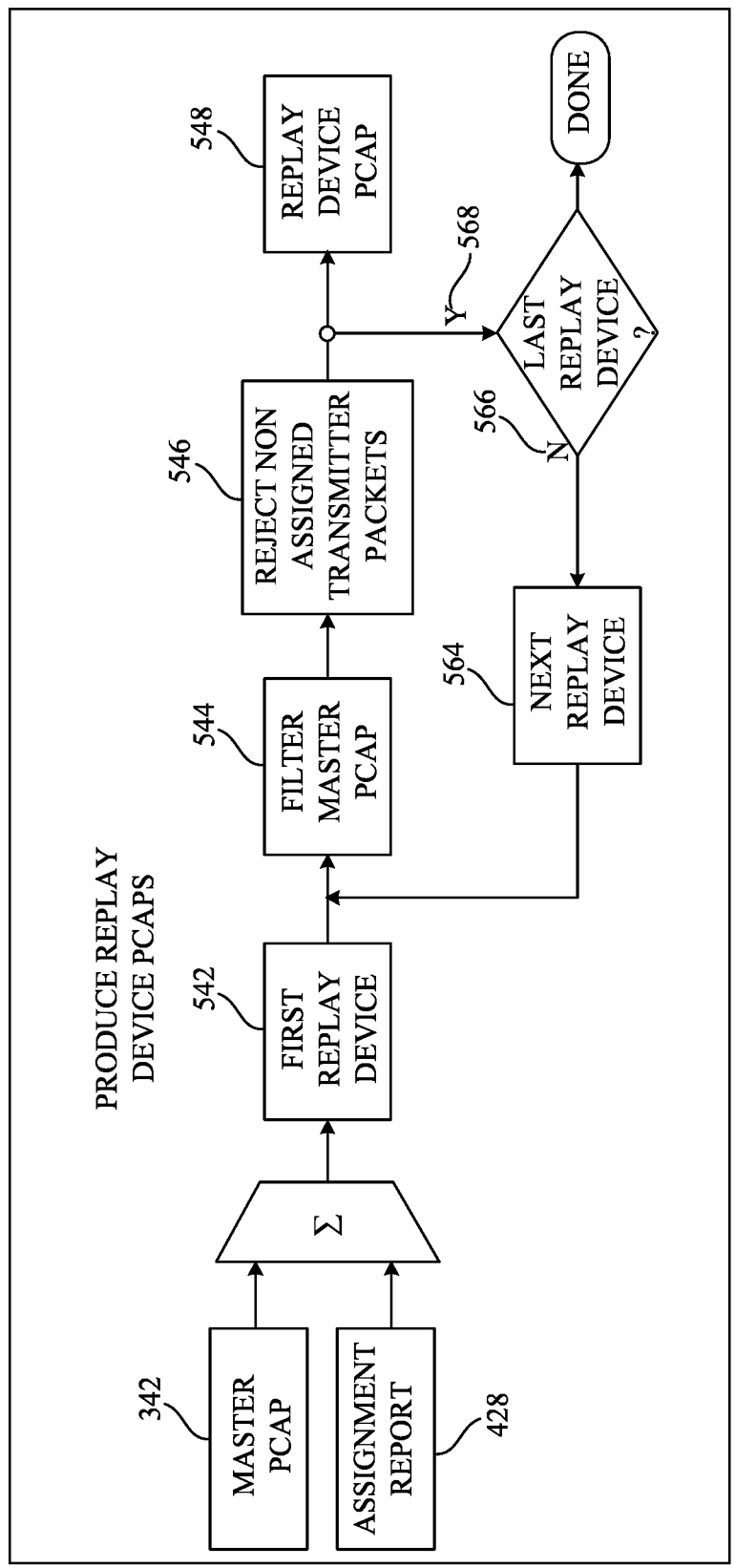

FIG. 5 illustrates the third step of the process for transforming a master PCAP file into a distributed Wi-Fi packet replay session: producing individual PCAP files for each replay device. The process to produce an individual PCAP file for each replay device 548 from the master PCAP file 342 is a filtering process. For a given replay device, the list of assigned transmitters is determined as described relative to FIG. 4. Then the master PCAP file is looped through and each packet's transmit channel and MAC address are compared to the list of assigned transmitters in assignment report 428. If the packet matches then it is appended to the individual PCAP file, otherwise it is filtered 544 and ignored. That is, non-assigned transmitter packets are rejected 546. This processing is repeated for each replay device, represented via the decision of "last replay device?" N 566 routing to next replay device 564. When the "last replay device?" Y 568 is reached, the process of producing individual replay device PCAPs is done.

Figure 6:
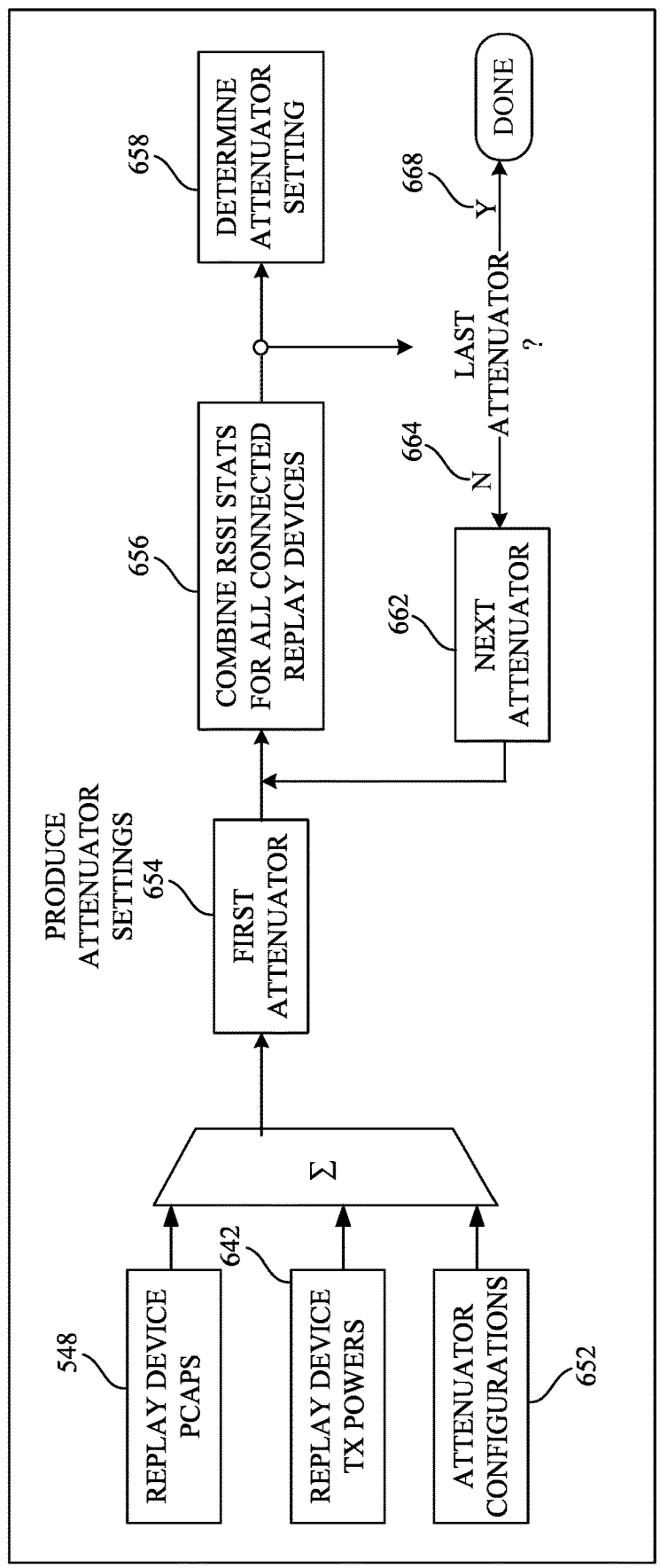

FIG. 6 shows the next step of the process for transforming a master PCAP file into a distributed Wi-Fi packet replay session: determining the level setting for each attenuator. The process to determine the level setting for each attenuator involves consideration of the replay devices connected to the attenuator via attenuator configurations 652, and evaluation of the individual PCAP files for those replay devices 548. For a given attenuator, the list of connected replay devices is determined. Then the individual PCAP files for the replay devices 548 are looped through and each packet from each file is examined for its RSSI value. The RSSI values from the packets are reduced to a set of combined statistics such as minimum, maximum, mode, and mean 656. Then the absolute power level output of the replay device's transmitters 642 is considered. The RSSI statistics and transmit powers are evaluated to determine the attenuator level setting 658. This processing is repeated for each attenuator, as represented in FIG. 6 via the decision of "last attenuator? Y" 668 and "last attenuator N" 664.

After producing replay device PCAP files 548 and determining attenuator level settings 658, system controller 128 sends this information to the replay devices 132, 172 and attenuators 122, 162 via the management ethernet network 138. For the replay device PCAP files 548, two methods are available. The files can be downloaded to local storage on the replay devices before the distributed replay session starts, or the files can be streamed across the management network 138 during the distributed replay session.

The process for transforming a master PCAP file into a distributed Wi-Fi packet replay session continues with starting the packet playback of all the replay devices simultaneously. The system controller 128 has more than one method available for starting playback on all of the replay devices simultaneously. One method is to signal the replay devices to wait for a special multicast or broadcast ethernet packet. That packet when sent by the system controller 128 would signal that start of playback. Another method is to signal to the replay devices an absolute time in the future at which the playback is to start. To stop playback, there are even more signaling methods available to the system controller 128 since there is no need for simultaneous playback stop.

Each replay device participates in the distributed replay session in the same way. After receiving the PCAP file or the beginning of the PCAP stream from the system controller 128, the replay device 132, 172 prepares its hardware and software for the playback and waits for the start signal.

While the replay session is in progress, each packet is retransmitted 'as is' according to the content in the packet. The PCAP format for the Wi-Fi packet contains a Radiotap header that includes the settings for interface type (e.g., AX, AC), bandwidth, rate, number of streams, and others. Where possible the replay device is configured to match these varying settings for each packet transmitted. The PCAP format for each packet also contains a timestamp that is used to determine the inter packet spacing. Each packet transmit is carefully timed by the replay device to replicate where possible the expected inter packet spacing.

The process for transforming a master PCAP file into a distributed Wi-Fi packet replay session concludes by stopping the packet playback of the replay devices.

Computer System

FIG. 7 is a simplified block diagram of an embodiment of a system 700 that can be used for high fidelity emulation of a Wi-Fi environment for testing with transmitters.

Computer system 710 typically includes a processor subsystem 772 which communicates with a number of peripheral devices via bus subsystem 750. These peripheral devices may include a storage subsystem 726, comprising a memory subsystem 722 and a file storage subsystem 736, user interface input devices 738, user interface output devices 778, and a network interface subsystem 776. The input and output devices allow user interaction with computer system 710 and network and channel emulators. Network interface subsystem 774 provides an interface to outside networks and devices of the system 700. The computer system further includes communication network 784 that can be used to communicate with user equipment (UE) units; for example, as a device under test.

The physical hardware components of network interfaces are sometimes referred to as network interface cards (NICs), although they need not be in the form of cards: for instance, they could be in the form of integrated circuits (ICs) and connectors fitted directly onto a motherboard, or in the form of microcells fabricated on a single integrated circuit chip with other components of the computer system.

User interface input devices 738 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710.

User interface output devices 778 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide nonvisual display such as via audio output devices. In general, use of the term "output device" is intended to include all possible types of devices and ways to output information from computer system 710 to the user or to another machine or computer system. The computer system further can include user interface output devices 778 for communication with user equipment.

Storage subsystem 726 stores the basic programming and data constructs that provide the functionality of certain embodiments of the present invention. For example, the various modules implementing the functionality of certain embodiments of the invention may be stored in a storage subsystem 726. These software modules are generally executed by processor subsystem 772.

Storage subsystem 726 typically includes a number of memories including a main random access memory (RAM) 734 for storage of instructions and data during program execution and a read only memory (ROM) 732 in which fixed instructions are stored. File storage subsystem 736 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 736. The host memory storage subsystem 726 contains, among other things, computer instructions which, when executed by the processor subsystem 772, cause the computer system to operate or perform functions as described herein. As used herein, processes and software that are said to run in or on "the host" or "the computer", execute on the processor subsystem 772 in response to computer instructions and data in the host memory storage subsystem 726 including any other local or remote storage for such instructions and data.

Bus subsystem 750 provides a mechanism for letting the various components and subsystems of computer system 710 communicate with each other as intended. Although bus subsystem 750 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, or any other data processing system or user device. Due to the ever-changing nature of computers and networks, the description of computer system 710 depicted in FIG. 7 is intended only as a specific example for purposes of illustrating embodiments of the present invention. Many other configurations of computer system 710 are possible having more or less components than the computer system depicted in FIG. 7.

Some Particular Implementations

We describe various implementations of high fidelity emulation of a Wi-Fi environment for testing with transmitters in the following paragraphs.

One implementation includes a disclosed method of configuring a Wi-Fi environment and testing with three or more transmitters set to differing output signal strengths, including using a packet capture (PCAP) file of captured packets from multiple stations with respective source addresses and radio frequency (RF) bands and channels within bands, the captured packets recording in metadata at least signal strength and time stamps. The disclosed method also includes analyzing the PCAP file to determine pairs of source addresses and channels, evaluating the pairs for signal strengths, allocating the pairs to three or more transmitters based on grouping by at least the channels and the evaluated signal strengths and setting output signal strengths of the transmitters based on the evaluated signal strengths, and using the time stamps on the captured packets, replaying the captured packets with synchronization over the transmitters at the set output signal strengths.

This system and other implementations of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

Some implementations of the disclosed method include a PCAP file with packets from multiple protocols.

Some implementations include time-varying pairs of source address and channel with varying signal strength overtime. For example, one implementation includes a MAC that jumps from one channel to another.

Some implementations include reallocating the time-varying pairs to different replay devices as signal strength varies.

Some implementations further include captured packets obtained from synchronized sniffers. Other implementations include captured packets obtained from sniffers operating on different Wi-Fi channels.

Some implementations include captured packets being streamed across the management network during the distributed replay session. Other implementations include captured packets being downloaded to local storage on the replay devices before the distributed replay session starts to be recalled from storage for replay at a later time.

Other implementations may include a tangible non-transitory computer readable storage medium, including storing program instructions loaded into memory that, when executed on processors, cause the processors to carry out a method for configuring a Wi-Fi environment and testing with three or more transmitters set to differing output signal strengths. A tangible non-transitory computer readable medium does not include a transitory wave form.

Yet other implementations may include a system for configuring a Wi-Fi environment and testing with three or more transmitters set to differing output signal strengths, the system including a processor, memory coupled to the processor and computer instructions from the non-transitory computer readable storage media loaded into the memory, according to the preceding computer readable media, described above.

Each of the features discussed in this particular implementation section for the first method implementation apply equally to this system implementation. As indicated above, all the system features are not repeated here and should be considered repeated by reference.

We claim as follows:

1. A method of configuring a Wi-Fi environment and testing with three or more transmitters set to differing output signal strengths, including:
   using a packet capture (PCAP) file of captured packets from multiple stations with respective source addresses and radio frequency (RF) bands and channels within bands, the captured packets recording in metadata at least signal strength and time stamps;
   analyzing the PCAP file to determine pairs of a source address and a channel;
   evaluating the pairs for signal strengths;
   allocating the pairs to three or more transmitters based on grouping by at least the channels and the evaluated signal strengths and setting output signal strengths of the transmitters based on the evaluated signal strengths; and
   using the time stamps on the captured packets, replaying the captured packets with synchronization over the transmitters at the set output signal strengths.

2. The method of claim 1, wherein the PCAP file includes packets from multiple protocols.

3. The method of claim 1, further including time-varying pairs of a source address and a channel with varying signal strength over time.

4. The method of claim 3, further including reallocating the time-varying pairs as signal strength varies.

5. The method of claim 1, further including the captured packets being streamed across a management network during replay.

6. The method of claim 1, further including captured packets being recalled from storage.

7. A tangible non-transitory computer readable storage medium, including program instructions loaded into memory that, when executed on processors, cause the processors to carry out a method of high fidelity emulation of a Wi-Fi environment for testing with three or more transmitters set to differing output signal strengths, including:
   using a packet capture (PCAP) file of captured packets from multiple stations with respective source addresses and radio frequency (RF) bands and channels within bands, the captured packets recording in metadata at least signal strength and time stamps;
   analyzing the PCAP file to determine pairs of a source address and a channel;
   evaluating the pairs for signal strengths;
   allocating the pairs to three or more transmitters based on grouping by at least the channels and the evaluated signal strengths and setting output signal strengths of the transmitters based on the evaluated signal strengths; and
   using the time stamps on the captured packets, replaying the captured packets with synchronization over the transmitters at the set output signal strengths.

8. The tangible non-transitory computer readable storage medium of claim 7, wherein the PCAP file includes packets from multiple protocols.

9. The tangible non-transitory computer readable storage medium of claim 7, further including time-varying pairs of a source address and channels with varying signal strength over time.

10. The tangible non-transitory computer readable storage medium of claim 9, further including reallocating the time-varying pairs as signal strength varies.

11. The tangible non-transitory computer readable storage medium of claim 8, further including the captured packets being streamed across a management network during replay.

12. The tangible non-transitory computer readable storage medium of claim 7, further including captured packets being recalled from storage.

13. A system including a processor, memory coupled to the processor, and computer instructions loaded into the memory that, when executed, cause the processor to emulate a Wi-Fi environment in high fidelity for testing with three or more transmitters set to differing output signal strengths, including:
   using a packet capture (PCAP) file of captured packets from multiple stations with respective source addresses and radio frequency (RF) bands and channels within bands, the captured packets recording in metadata at least signal strength and time stamps;
   analyzing the PCAP file to determine pairs of a source address and a channel;
   evaluating the pairs for signal strengths;
   allocating the pairs to three or more transmitters based on grouping by at least the channels and the evaluated signal strengths and setting output signal strengths of the transmitters based on the evaluated signal strengths; and
   using the time stamps on the captured packets, replaying the captured packets with synchronization over the transmitters at the set output signal strengths.

14. The system of claim 13, wherein the PCAP file includes packets from multiple protocols.

15. The system of claim 13, further including time-varying pairs of a source address and channels with varying signal strength over time.

16. The system of claim 15, further including reallocating the time-varying pairs as signal strength varies.

17. The system of claim 14, further including the captured packets being streamed across a management network during replay.

18. The system of claim 13, further including captured packets being recalled from storage.

\* \* \* \* \*